(12) United States Patent
Ko

(10) Patent No.: US 7,706,228 B2
(45) Date of Patent: Apr. 27, 2010

(54) SYSTEM AND METHOD FOR CONTROLLING OPTICAL PICKUP UNIT

(75) Inventor: Yu-Cheng Ko, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 629 days.

(21) Appl. No.: 11/565,642

(22) Filed: Dec. 1, 2006

(65) Prior Publication Data
US 2007/0223334 A1    Sep. 27, 2007

(30) Foreign Application Priority Data
Mar. 23, 2006    (CN) .................. 2006 1 0034657

(51) Int. Cl.
*G11B 7/00* (2006.01)

(52) U.S. Cl. .................. 369/53.23; 369/44.27

(58) Field of Classification Search .................. None
See application file for complete search history.

(56) References Cited

U.S. PATENT DOCUMENTS

| | | | |
|---|---|---|---|
| 5,136,569 A | 8/1992 | Fennema | |
| 5,175,716 A | 12/1992 | Min | |
| 5,228,019 A | 7/1993 | Yanagi | |
| 5,331,423 A | 7/1994 | Ota | |
| 5,764,610 A | 6/1998 | Yoshida et al. | |
| 6,137,751 A * | 10/2000 | Kim | 369/30.36 |
| 6,760,289 B1 | 7/2004 | Ide | |
| 7,474,596 B2 * | 1/2009 | Takeda | 369/44.28 |
| 2006/0023576 A1 | 2/2006 | Takeda | |

* cited by examiner

*Primary Examiner*—Joseph H Feild
*Assistant Examiner*—Joseph Haley
(74) *Attorney, Agent, or Firm*—Winston Hsu (57) ABSTRACT

A system for supplying a driving voltage to move an optical pickup unit to a predetermined position includes a storage unit, an output unit, and a drive module. The storage unit is used for storing instructions. The instructions include a move-outwards instruction, a move-inwards instruction, and a move discriminate-position instruction. The output unit is constructed and arranged for outputting the instructions. The drive module is coupled to the output unit for supplying the driving voltage to move the optical pickup unit toward an outermost position based on the move-outwards instruction, move the optical pickup unit to an innermost position based on the move-inwards instruction, and move the optical pickup unit from the innermost position to the predetermined position based on the move discriminate-position instruction.

20 Claims, 6 Drawing Sheets

SYSTEM AND METHOD FOR CONTROLLING OPTICAL PICKUP UNIT

BACKGROUND OF THE INVENTION

1. Field of the Invention

This invention relates to optical disc drives and, more particularly, to control system and control method for moving an optical pickup unit to discriminate optical discs.

2. Description of Related Art

Nowadays, optical discs are widely used for storing information. There are various types of optical discs, such as CDs, DVDs, and Blu-ray Discs, with various specifications.

An optical disc drive is usually required to be capable of recording and/or reproducing data onto and/or from the different type optical discs. Generally, during recording/reproducing, the optical disc drive needs to move a pick-up unit to a predetermined position so as to make light beams emitted by the pick-up unit to be accurately focused at a predetermined track on the disc. In order to move the pick-up unit to the predetermined position, a moving direction and a moving distance should be accurately calculated. For example, when a disc is loaded into the optical disc drive, a first thing is to discriminate the type of the loaded disc. Therefore, the optical pickup unit is needed to be moved to a predetermined position for discrimination of the type of the loaded disc.

Figure 6:
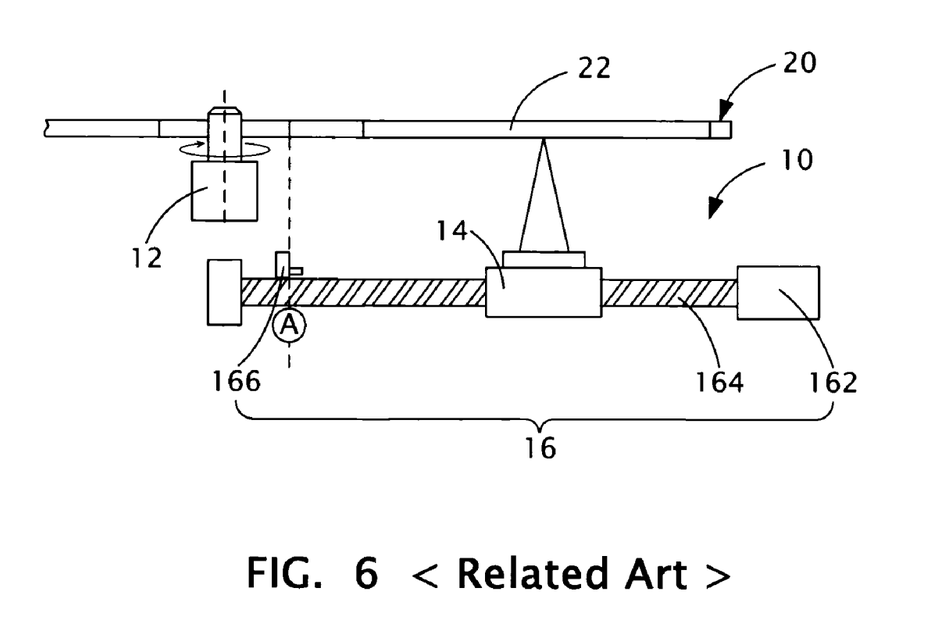
FIG. 6 is a schematic diagram of a traditional optical disc drive.

Referring to FIG. 6, a traditional optical disc drive 10 which is capable of discriminating types of optical discs is illustrated. The optical disc drive 10 includes a spindle motor 12, an optical pickup unit 14, and a driving apparatus 16 for moving the optical pickup unit 14. The driving apparatus 16 includes a sled motor 162, a sled shaft 164, and a sensor 166. An optical disc 20 is arranged on and rotated at a predetermined velocity by the spindle motor 12. The optical pickup unit 14 is disposed to face a read-out surface of the optical disc 20. The optical pickup unit 14 can be moved along a radial direction of the optical disc 20 by the sled motor 162 and the sled shaft 164.

The optical disc 20 includes a plurality of spiral recording tracks (not shown) extending from an inner side to an outer side thereof. Generally, data recorded on the optical disc 20 is read from the inner side to the outer side. Therefore, the optical pickup unit 14 is moved from the inner side to the outer side along the radial direction of the optical disc 20 during a reproducing process. Before the reproducing process, the optical disc 20 should be discriminated. A preferred predetermined point to discriminate the optical disc 20 is a start point of a data area 22. To discriminate the optical disc, the optical pickup unit 14 is first moved to an innermost position A of the optical disc 20 and then moved from the innermost position A to the predetermined point.

The optical disc drive 10 employs the sensor 166 to detect whether the optical pickup unit 14 has reached the innermost position A. The sensor 166 can be a switch. If the optical pickup unit 14 reaches the innermost position A, the sensor 166 is triggered and generates a detecting signal to indicate that the optical pickup unit 14 has reached the innermost position A. The detecting signal is used to prevent the optical pickup unit 14 from further moving. After reaching the innermost position A, the optical pickup unit 14 goes astern toward the predetermined position to discriminate the optical disc 20.

However, the structure of the traditional optical disc drive 10 is complex as the sensor 166 is critical and must be employed to detect whether the optical pickup unit 14 has reached the predetermined innermost position A.

Therefore, an optical disc drive with a simplified structure is desired.

SUMMARY OF THE INVENTION

A system for supplying a driving voltage to move an optical pickup unit to a predetermined position includes a storage unit, an output unit, and a drive module. The storage unit is used for storing instructions. The instructions include a move-outwards instruction, a move-inwards instruction, and a move discriminate-position instruction. The output unit is constructed and arranged for outputting the instructions. The drive module is coupled to the output unit for supplying the driving voltage to move the optical pickup unit toward an outermost position based on the move-outwards instruction, move the optical pickup unit to an innermost position based on the move-inwards instruction, and move the optical pickup unit from the innermost position to the predetermined position based on the move discriminate-position instruction.

A method for controlling a driving voltage to move an optical pickup unit to a predetermined position includes steps of: outputting a move-outwards instruction to control the driving voltage for moving the optical pickup unit toward an outermost position; outputting a move-inwards instruction to control the driving voltage for moving the optical pickup unit to an innermost position; and outputting a move discriminate-position instruction to control the driving voltage for moving the optical pickup unit to an predetermined position.

A storage medium recorded with an application program. The application program has computer executable steps of: outputting a move-outwards instruction for controlling a driving voltage for moving an optical pickup unit toward an outermost position; outputting a move-inwards instruction for controlling the driving voltage for moving the optical pickup unit to an innermost position; outputting a move discriminate-position instruction for controlling the driving voltage for moving the optical pickup unit to a predetermined position.

Other advantages and novel features will become more apparent from the following detailed description of preferred embodiments when taken in conjunction with the accompanying drawings, in which:

BRIEF DESCRIPTION OF THE DRAWINGS

Many aspects of the optical pickup unit control system and method can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiment of the present optical disc drive, in detail.

Figure 1:
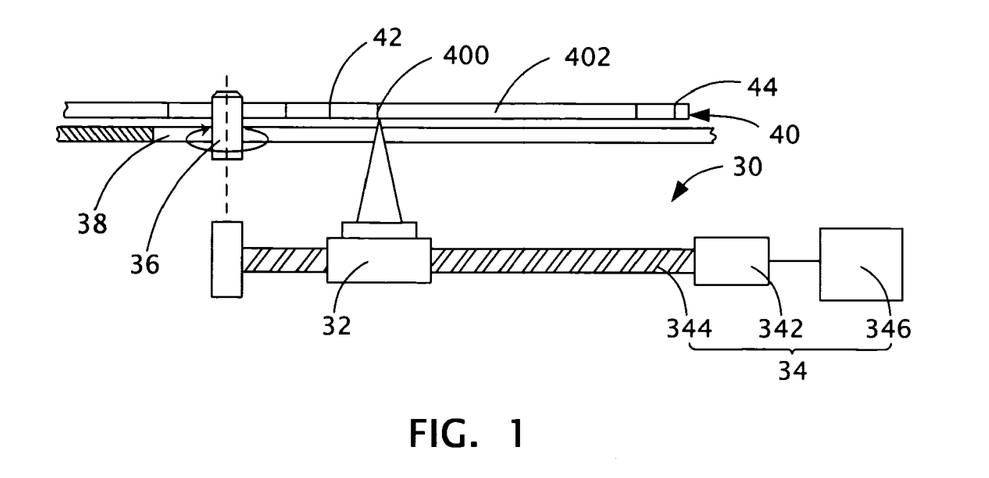
FIG. 1 is a schematic diagram of an optical disc drive in accordance with an exemplary embodiment, the optical disc drive including an optical pickup unit and an optical pickup unit control system.

Referring to FIG. 1, an optical disc drive 30 includes an optical pickup unit 32, a driving apparatus 34, a spindle motor 36, and a tray 38. The optical pickup unit 32 generates and focuses light beams on an optical disc 40, and receives light beams reflected by the optical disc 40, thereby recording/reproducing data on/from the optical disc 40.

The driving apparatus 34 is used for adjusting positions of the optical pickup unit 32, and includes a motor 342, an actuator 344, and a control system 346. The actuator 344 is fixed to a rotor of the motor 342. The optical pickup unit 32 is in contact with the actuator 344 and moves according to a rotation of the actuator 344. In other words, the motor 342 rotates the actuator 344, so as to move the optical pickup unit 32 along the actuator 344. The control system 346 is electrically coupled to the motor 342 and supplies a driving voltage to rotate the motor 342. The driving voltage determines a rotational direction and a rotational speed of the motor 342.

In order to discriminate the optical disc 40 before recording/reproducing the optical disc 40, the control system 346 supplies the motor 342 with the driving voltage to move the optical pickup unit 32 to a discrimination position 400 of the optical disc 40. Generally, the beginning of a data area 402 of the optical disc 40 is an ideal discrimination position to start discriminating the type of the optical disc 40.

Figure 2:
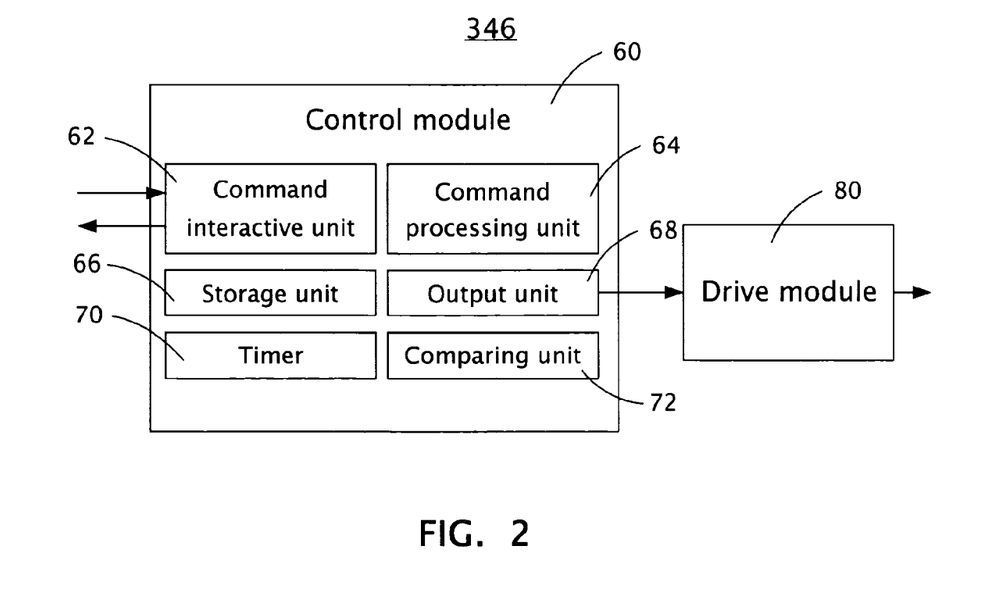
FIG. 2 is a block diagram illustrating the optical pickup unit control system of FIG. 1.

Referring to FIG. 2, the control system 346 includes a control module 60 and a drive module 80. The drive module 80 is constructed and arranged for supplying the driving voltage to the motor 334 for driving the optical pickup unit 32 to move between an innermost position 42 and an outermost position 44 of the optical disc 40. The control module 60 is electrically coupled to the drive module 80 and sends instructions to the drive module 80 so as to adjust the driving voltage supplied by the drive module 80.

The control module 60 includes a command interactive unit 62, an command processing unit 64, a storage unit 66, an output unit 68, a timer 70, and a comparing unit 72.

The command interactive unit 62 is configured for receiving discrimination commands inputted from an external device (not shown) for discriminating the optical disc 40. There are at least two states when the optical disc drive 30 needs to discriminate the type of optical disc 40; a first state is when the optical disc drive 30 is powered on and begins initialization with the optical disc 40 already pre-loaded within, and a second state is when the optical disc 40 has just been carried from an open position (disc tray open) to a closed position (disc tray within). Therefore, the discrimination commands include at least a power-on discrimination command and a disc-load discrimination command. The power-on discrimination command and the disc-load discrimination command are used for discriminating the optical disc 40 when the disc drive 30 is in the first and second states respectively.

The command processing unit 64 is used for identifying a type of the discrimination command received by the command interactive unit 322. If the discrimination command is the power-on discrimination command, the control module 60 controls the drive module 80 to supply a power-on voltage. If the discrimination command is the disc-load discrimination command, the control module 60 controls the drive module 80 to supply a disc-load voltage.

The storage unit 66 stores power-on discrimination instructions and disc-load discrimination instructions for controlling the power-on voltage and for controlling the disc-load voltage respectively. Both the power-on discrimination instructions and the disc-load discrimination instructions include a move-outwards instruction for moving the optical pickup unit 32 towards the outermost position 44, a move-inwards instruction for moving the optical pickup unit 32 to the innermost position 42, and a move discriminate-position instruction for moving the optical pickup unit 32 to the discrimination position 400 of the optical disc 40. Furthermore, the storage unit 66 stores adjust instructions for adjusting a position of the optical pickup unit 32 so as to precisely place the optical pickup unit 32 to the discrimination position 400 when the command interactive unit 62 receives an adjust command.

The output unit 68 is used for outputting the power-on/disc-load discrimination instructions stored in the storage unit 66 based on the type of the discrimination command identified by the command processing unit 64.

The timer 70 is constructed and arranged for timing a duration when an instruction is being outputted by the output unit 68.

The comparing unit 72 is used for comparing the duration timed by the timer 70 with a predetermined time. If the duration reaches the predetermined time, the comparing unit 72 signals the output unit 68 indicating that the instruction has been outputted for the predetermined time. Generally, the predetermined time is a continuous time duration that is enough to complete outputting the instruction. That is, the comparing unit 72 signals a completion of outputting the instruction. After being signaled by the comparing signal, the output unit 68 stops outputting the instruction.

After receiving a discrimination command, the command processing unit 64 identifies the type of the discrimination command. If the discrimination command is the power-on discrimination command, the output unit 68 outputs the power-on discrimination instructions to the drive module 80. The drive module 80 supplies the power-on voltage based on the power-on discrimination instructions.

Figure 3:
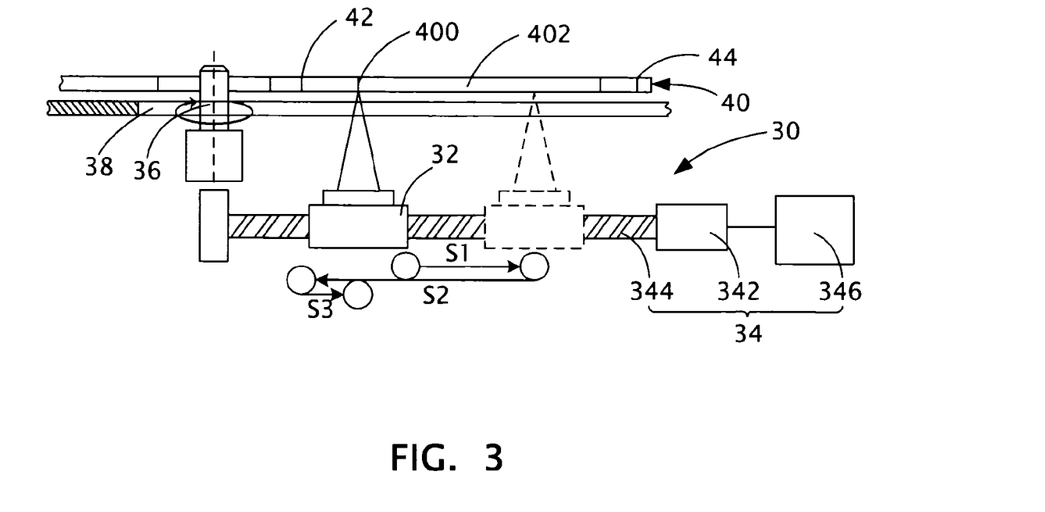
FIG. 3 is a schematic diagram representing a moving procedure of the optical pickup unit.

Referring to FIG. 3, a power-on moving process controlled by the power-on voltage includes a first stage S1, a second stage S2, and a third stage S3. The first stage is controlled by the move-outwards instruction that moves the optical pickup unit 32 towards the outermost position 44 of the optical disc 40. The second stage S2 is controlled by the move-inwards instruction that moves the optical pickup unit 32 to the innermost position 42 of the optical disc 40. The third stage S3 is controlled by the move discriminate-position instruction for moving the optical pickup unit 32 to the discrimination position 400 of the optical disc 40. The power-on voltage is continuously supplied to the motor 342 without interrupts, thus the optical pickup unit 32 moves continuously during the three stages without intervals.

If the discrimination command is the disc-load discrimination command, the output unit 68 outputs the disc-load discrimination instructions to the drive module 80. The drive module 80 supplies the disc-load voltage based on the disc-load discrimination instructions. A disc-load moving process controlled by the disc-load voltage includes the first stage S1, the second stage S2, and the third stage S3 as well. Compared to the power-on moving process, the disc-load moving process further includes a pause stage between the first stage S1 and the second stage S2. The disc-load voltage is zero at the pause stage, thus the optical pickup unit 32 stops moving during the pause stage so as to allow the optical disc 40 to be loaded to the closed position. Furthermore, the pause stage can be arranged between the second stage S2 and the third stage S3 as well.

During the first stage S1, the power-on/disc-load voltage is controlled at a move-outwards voltage value U1. The motor 342 rotates the actuator 344 controlled by the power-on/disc-load voltage and the optical pickup unit 32 is moved toward the outermost position 44 of the optical disc 40 accordingly. Preferably, during the first stage S1, a outward moving distance of the optical pickup unit 32 is equal to or greater than a half of a length between the innermost position 42 and the outermost position 44.

After the first stage S1, if the discrimination command is the disc-load discrimination command, the command interactive unit 62 sends a signal so as to eject the tray 38 to load the disc 40. The pause stage lasts from when the signal is sent to when the tray 38 has reached the closed position. During the pause stage, the disc-load voltage is zero and the optical pickup unit 32 does not move.

During the second stage S2, the optical pickup unit 32 moves toward the innermost position 42. Preferably, a polarity of the power-on/disc-load voltage during the second stage S2 is opposite to the first stage S1, thus the moving direction of the optical pickup unit 32 during the second stage S2 is opposite to the moving direction of the optical pickup unit 32 during the first stage S1.

At the third stage S3, the optical pickup unit 32 moves toward the outermost position 44 so as to move the optical pickup unit 32 to the discrimination position 400. Preferably, a polarity of the power-on/disc-load voltage during the third stage S3 is the same as the polarity of the first stage S1, thus the optical pickup unit 32 moves toward the outermost position 44.

The operation of the control system 346 will be described in detail with reference to FIG. 4 and FIG. 5 where an exemplary procedure of a driving control method is illustrated.

Figure 4:
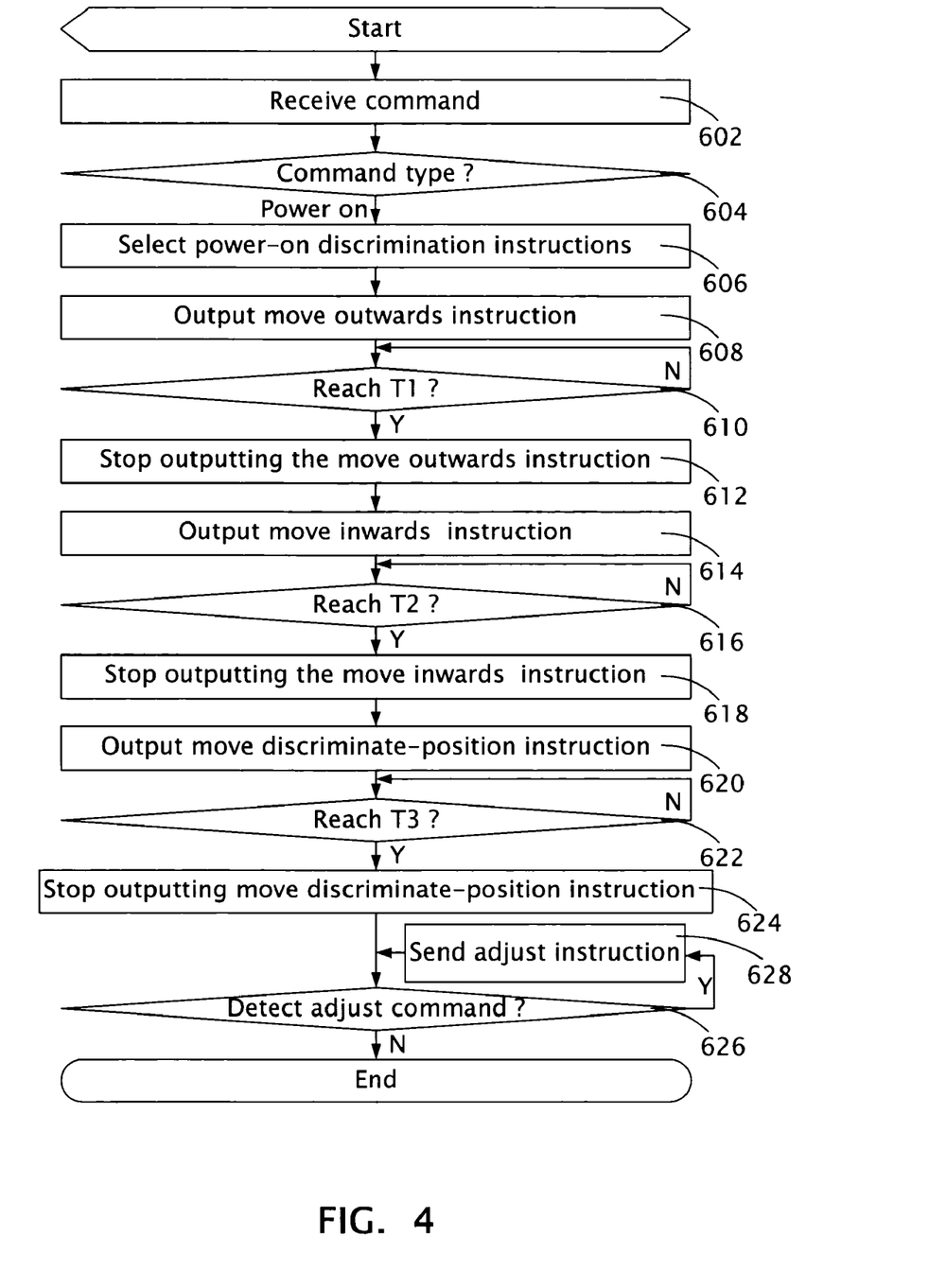
FIG. 4 is a flowchart of a first exemplary procedure of an optical pickup unit driving method.

Referring to FIG. 4, a procedure of the driving control method of the first state is illustrated. In step 602, the command interactive unit 62 receives the discrimination command.

In step 604, the command processing unit 64 identifies whether the discrimination command is the power-on discrimination command or the disc-load discrimination command.

If the discrimination command is identified as the power-on discrimination command in step 604, the output unit 68 selects the power-on discrimination instructions from the storage unit 66 (step 606).

In step 608, the output unit 68 outputs the move-outwards instruction of the power-on discrimination instructions to the drive module 80. The drive module 80 supplies the power-on voltage having the move-outwards voltage value U1 based on the move-outwards instruction.

In step 610, the comparing unit 72 compares a duration of the move-outwards instruction timed by the timer 70 with a predetermined move-outwards time T1. If the duration does not reach the predetermined move-outwards time T1, the output unit 68 continues outputting the move-outwards instruction.

It is presumed that it takes a move-outwards time period Tp1 for the optical pickup unit 32 to move from the innermost position 42 to the outermost position 44 controlled by the move-outwards voltage value U1. The predetermined move-outwards time T1 is set to be equal to or greater than a half of Tp1, that is, $T1 \geq 0.5 Tp1$. Therefore, once the move-outwards voltage value U1 is determined, the Tp1 can be obtained based on the move-outwards voltage value U1, and the predetermined move-outwards time T1 can be calculated based on the relationship of $T1 \geq 0.5 Tp1$.

If in step 610, the duration reaches the predetermined move-outwards time T1, the comparing unit 72 sends a comparing signal to the output unit 68 to inform the output unit 68 that the move-outwards instruction has been kept outputting for the predetermined move-outwards time T1. After receiving the comparing signal, the output unit 68 stops outputting the move-outwards instruction (step 612).

In step 614, the output unit 68 outputs the move-inwards instruction of the power-on discrimination instructions to the drive module 80. The drive module 80 supplies the power-on voltage with a move-inwards voltage value U2 based on the move-inwards instruction.

In step 616, the comparing unit 72 compares a duration of the move-inwards instruction timed by the timer 70 with a predetermined move-inwards time T2. The output unit 68 continues outputting the move-inwards instruction until the duration reaches the predetermined move-inwards time T2.

The predetermined move-inwards time T2 is set to be long enough to move the optical pickup unit 32 to the innermost position 42 controlled by the move-inwards voltage value U2. It is presumed that it takes a move-inwards time period Tp2 to move the optical pickup unit 32 from the outermost position 44 to the innermost position 42 controlled by the move-inwards voltage value U2. The predetermined move-inwards time T2 is equal to or greater than the Tp2, thereby being capable of moving the optical pickup unit 32 to the innermost position 42.

If in step 616, the duration reaches the predetermined move-inwards time T2, the comparing unit 72 sends the comparing signal to the output unit 68 to inform the output unit 68 that the move-inwards instruction has been kept outputting for the predetermined move-inwards time T2. After receiving the comparing signal, the output unit 68 stops outputting the move-inwards instruction (step 618).

In step 620, the output unit 68 outputs the move discriminate-position instruction of the power-on discrimination instructions to the drive module 80. The drive module 80 supplies the power-on voltage having a move discriminate-position voltage value U3 based on the move discriminate-position instruction.

In step 622, the comparing unit 72 compares a duration of the move discriminate-position instruction timed by the timer 70 with a predetermined move discriminate-position time T3. If the duration does not reach the third continuous predetermined time T3, the output unit 68 continues outputting the move discriminate-position instruction.

It is presumed that it will take a move discriminate-position time period Tp3 to move the optical pickup unit 32 from the innermost position 42 to the discrimination position 400 controlled by the move discriminate-position voltage value U3. The predetermined move discriminate-position time T3 is set to equal to the Tp3.

If in step 622, the duration reaches the predetermined move discriminate-position time T3, the comparing unit 72 signals the output unit 68 indicating that the move discriminate-position instruction has been outputted for the third predetermined time T2. After being signaled by the comparing unit 72 the output unit 68 stops outputting the move discriminate-position instruction (step 624).

In step 626, the command interactive unit 62 detects whether an adjust command is received for adjusting the position of the optical pickup unit 32 so as to precisely place the optical pickup unit 32 to the discrimination position 400.

If in step 626, the adjust command is received, the output unit 68 sends a adjust instruction to the drive module 80 so as to adjust the position of the optical pickup unit 32 (step 628).

After the adjust instruction is sent, the procedure loops back to step 626. If in step 626, the adjust command is not received, the procedure is terminated.

Figure 5:
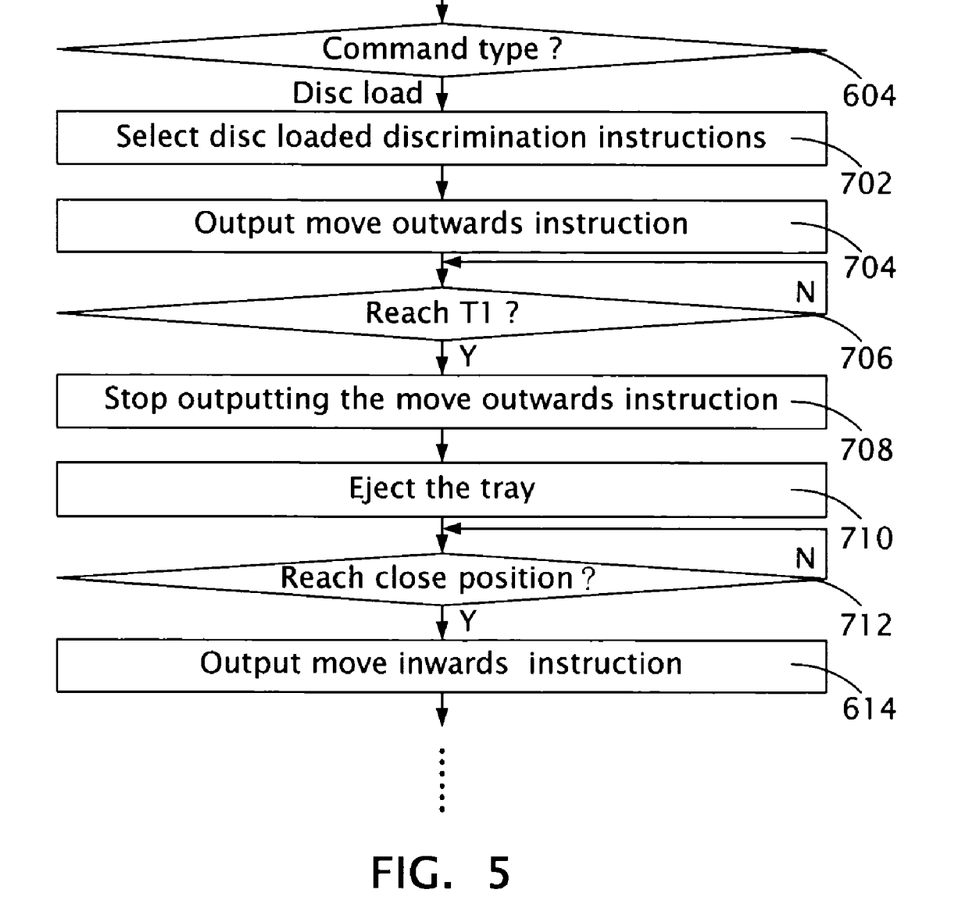
FIG. 5 is a flowchart of a second exemplary procedure of an optical pickup unit driving method.

Referring to FIG. 5, a procedure of the driving control method of the second state is illustrated. If in step 604, the discrimination command is identified as the disc-load discrimination command, the output unit 68 selects the disc-load discrimination instructions from the storage unit 66 (step 702).

In step 704, the output unit 68 outputs the move-outwards instruction of the disc-load discrimination instructions to the drive module 80. The drive module 80 supplies the disc-load voltage having the move-outwards voltage value U1 based on the move-outwards instruction.

In step 706, the comparing unit 72 compares a duration of the move-outwards instruction timed by the timer 70 with the predetermined move-outwards time T1. If the duration does not reach the predetermined move-outwards time T1, the output unit 68 keeps outputting the move-outwards instruction.

If in step 706, the duration reaches the predetermined move-outwards time T1, the comparing unit 72 sends a comparing signal to the output unit 68 to inform the output unit 68 that the move-outwards instruction has been kept outputting for the predetermined move-outwards time T1, thus the output unit 68 stops outputting the move-outwards instruction (step 708).

In step 710, the command interactive unit 62 sends a signal for ejecting the tray 38 to load the disc 40.

In step 712, the command interactive unit 62 determines whether a loaded signal is received indicating the optical disc 40 has reached the closed position. If the optical disc 40 has not reached the closed position, the procedure loops back to step 712 so as to wait the optical disc 40 to be loaded to the closed position.

If in step 712, the optical disc 40 has reached the closed position, the output unit 68 outputs the move-inwards instruction of the disc-load discrimination instructions to the drive module 80. The drive module 80 supplies the disc-load voltage having the move-inwards voltage value U2 based on the move-inwards instruction (step 614). Subsequent procedures of the second state are similar to the first state showing in FIG. 4 from step 616 to step 628.

The driving apparatus 34 drives the optical pickup unit 32 to sequentially move the first distance towards the outermost position 44, and then to the innermost position 42, and finally to the discrimination position 400 of the optical disc 40. Thus discrimination of the optical disc 40 can be implemented without a sensor for detecting whether the optical disc 40 has reached the innermost position 42. The structure of the driving apparatus 34 of the optical disc drive 30 is thus simplified.

Optimally, the predetermined move-outwards time T1 is equal to the half of the Tp1, thus a longest time during which the motor 342 is rotating while the optical pickup unit 32 does not move is 0.5Tp1. For example, if the optical pickup unit 32 locates at the innermost position 42 when the optical disc drive 30 is powered on, the control system 346 supplies the power-on voltage to rotate the motor 342 at a first direction, thus the driving apparatus 34 drives the optical pickup unit 32 to move toward the outermost position 44 for 0.5Tp1. Then the control system 346 changes the polarity of the power-on voltage to rotate the motor 342 in a second direction opposite to the first direction, thus driving the optical pickup unit 32 to move toward the innermost position 42. After a half of the Tp2, the optical pickup unit 32 reaches the innermost position 42. After that, the motor 342 keeps rotating at the second direction until the following half of the Tp2 has elapsed. However, the optical pickup unit 32 remains at the innermost position 42 and does not move. If the optical pickup unit 32 locates at any position other than the innermost position 42 when the optical disc drive 30 is powered on, it will take more than a half of the Tp2 for the optical pickup unit 32 to reach the innermost position 42, then a time period during which the motor 342 is rotating while the optical pickup unit 32 does not move is less than the half of the Tp2.

It is easy to be understood that the discrimination position 400 can be any other predetermined positions, for example, a target track or a beginning point of a lead-in area.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A system for supplying a driving voltage to move an optical pickup unit to a predetermined position, comprising:
   a command interactive unit for receiving commands for moving the optical pickup unit, the commands comprising a power-on discrimination command for discriminating a type of an optical disc when an optical disc drive is powered on and begins initialization with the optical disc already pre-loaded therein, and a disc-load discrimination command for discriminating the type of the optical disc when the optical disc is loaded in from outside of the optical disc drive after powering on;
   a storage unit for storing instructions, the instructions comprising a move-outwards instruction for instructing the optical pickup unit to move toward an outermost position, a move-inwards instruction for instructing the optical pickup unit to move toward an innermost position, and a move discriminate-position instruction for instructing the optical pickup unit to move from the innermost position to the predetermined position;
   an output unit constructed and arranged for outputting the instructions; and
   a drive module coupled to the output unit for supplying the driving voltage to sequentially move the optical pickup unit toward the outermost position, then to the innermost position, and finally from the innermost position to the predetermined position based on the instructions in responding to one of the power-on discrimination command and the disc-load discrimination command.

2. The system as claimed in claim 1, further comprising a command processing unit for identifying which one of the power-on discrimination command and the disc-load discrimination command is received.

3. The system as claimed in claim 1, wherein the command interactive unit sends a signal for ejecting a tray of the optical disc drive to load the optical disc at the outside of the optical disc drive when the outputting of the move-outwards instruction or the move-inwards instruction is completed during responding to the disc-load discrimination command.

4. The system as claimed in claim 1, further comprising a timer for timing respective durations of outputting the move-outwards instruction, the move-inwards instruction, and the move discriminate-position instruction.

5. The system as claimed in claim 4, further comprising a comparing unit for comparing each respective duration with a respective predetermined time.

6. The system as claimed in claim 5, wherein when each respective duration reaches the respective predetermined time, the comparing unit signals the output unit to stop outputting the respective move-outwards instruction, move-inwards instruction, or move discriminate-position instruction.

7. A method for supplying a driving voltage to move an optical pickup unit to a predetermined position, the method comprising:
firstly outputting a move-outwards instruction for controlling the driving voltage for moving the optical pickup unit toward an outermost position for a predetermined time period;
then outputting a move-inwards instruction for controlling the driving voltage for moving the optical pickup unit to an innermost position; and
finally outputting a move discriminate-position instruction for controlling the driving voltage for moving the optical pickup unit from the innermost position to the predetermined position.

8. The method as claimed in claim 7, further comprising receiving commands for triggering the sequential output of the move-outwards instruction, the move-inwards instruction, and the move discriminate-position instruction, wherein the commands comprise a power-on discrimination command for discriminating a type of an optical disc when an optical disc drive is powered on with the optical disc already pre-loaded therein.

9. The method as claimed in claim 7, further comprising receiving commands for triggering the sequential output of the move-outwards instruction, the move-inwards instruction, and the move discriminate-position instruction, wherein the commands comprise a disc-load discrimination command for discriminating a type of an optical disc when the optical disc has just been carried from an open position of a tray of the optical disc drive to a closed position of the tray of the optical disc drive.

10. The method as claimed in claim 9, further comprising the step of sending a signal to indicate the tray can start to eject to load the optical disc at the open position when the outputting of the move-outwards instruction is completed.

11. The method as claimed in claim 10, further comprising:
determining whether a loaded signal indicating the optical disc has been carried to the closed position is received; and
outputting the move-inwards instruction when the loaded signal is received.

12. The method as claimed in claim 7, further comprising:
timing respective durations of outputting the move-outwards instruction, the move-inwards instruction, and the move discriminate-position instruction; and
sending a comparing signal to stop outputting the respective move-outwards instruction, move-inwards instruction, or move discriminate-position instruction when the respective duration reaches a respective predetermined time.

13. The system as claimed in claim 1, wherein in responding to the power-on discrimination command, the driving voltage does not have zero values, and the optical pickup unit moves continuously from an original position toward the outermost position for a predetermined time period, then to the innermost position, and finally from the innermost position to the predetermined position.

14. The system as claimed in claim 13, wherein the predetermined time period is not shorter than half of a time period during which the optical pickup unit is capable of moving from the innermost position to the outermost position.

15. The system as claimed in claim 1, wherein in responding to the disc-load discrimination command, the driving voltage has zero values, and the optical pickup unit moves from an original position toward the outermost position for a predetermined time period firstly, stops for a period of time, then moves to the innermost position, and finally moves to the predetermined position.

16. The system as claimed in claim 1, wherein in responding to the disc-load discrimination command, the driving voltage has zero values, and the optical pickup unit moves from an original position toward the outermost position for a predetermined time period firstly, then moves to the innermost position, stops for a period of time, and finally moves to the predetermined position.

17. The method as claimed in claim 8, wherein in responding to the power-on discrimination command, the driving voltage does not have zero values, and the optical pickup unit moves continuously from an original position toward the outermost position for a predetermined time period, then to the innermost position, and finally from the innermost position to the predetermined position based on the move-outwards instruction, the move-inwards instruction, and the move discriminate-position instruction.

18. The method as claimed in claim 9, wherein in responding to the disc-load discrimination command, the driving voltage has zero values, and the optical pickup unit moves from an original position toward the outermost position for a predetermined time period firstly, stops for a period of time, then moves to the innermost position, and finally moves to the predetermined position based on the move-outwards instruction, the move-inwards instruction, and the move discriminate-position instruction.

19. The method as claimed in claim 9, wherein in responding to the disc-load discrimination command, the driving voltage has zero values, and the optical pickup unit moves from an original position toward the outermost position for a predetermined time period firstly, then moves to the innermost position, stops for a period of time, and finally moves to the predetermined position.

20. A method for controlling a driving voltage to move an optical pickup unit to a predetermined position, the method comprising:
receiving commands for moving the optical pickup unit, the commands comprising a disc-load discrimination command for discriminating a type of an optical disc when the optical disc has just been carried from an open position of a tray of the optical disc drive to a closed position of the tray of the optical disc drive;
identifying a type of the commands;
sequentially outputting a move-outwards instruction for controlling the driving voltage for moving the optical pickup unit toward an outermost position, a move-inwards instruction for controlling the driving voltage for moving the optical pickup unit to an innermost position, and a move discriminate-position instruction for controlling the driving voltage for moving the optical pickup unit from the innermost position to the predetermined position; and
sending a signal to indicate the tray can start to eject to load the optical disc at the open position when the outputting of the move-outwards instruction is completed.

* * * * *